(12) United States Patent
Jeon

(10) Patent No.: US 11,450,927 B2
(45) Date of Patent: Sep. 20, 2022

(54) BATTERY MODULE

(71) Applicant: Samsung SDI Co., Ltd., Yongin-si (KR)

(72) Inventor: Doosung Jeon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 16/319,030

(22) PCT Filed: Jul. 17, 2017

(86) PCT No.: PCT/KR2017/007641
§ 371 (c)(1),
(2) Date: Jan. 18, 2019

(87) PCT Pub. No.: WO2018/016816
PCT Pub. Date: Jan. 25, 2018

(65) Prior Publication Data
US 2019/0221817 A1 Jul. 18, 2019

(30) Foreign Application Priority Data
Jul. 21, 2016 (KR) .................. 10-2016-0092886

(51) Int. Cl.
*H01M 50/507* (2021.01)
*H01M 50/502* (2021.01)
(Continued)

(52) U.S. Cl.
CPC ......... *H01M 50/502* (2021.01); *H01M 50/20* (2021.01); *H01M 50/50* (2021.01)

(58) Field of Classification Search
None
See application file for complete search history.

(56) References Cited

U.S. PATENT DOCUMENTS 5,804,770 A 9/1998 Tanaka
8,338,710 B2 12/2012 Maguire et al.
(Continued)

FOREIGN PATENT DOCUMENTS

CN 1054706 C 7/2000
CN 102257654 A 11/2011
(Continued)

OTHER PUBLICATIONS

Korean Patent Office Action for corresponding Korean Patent Application No. 10-2016-0092886, dated Sep. 11, 2019, 7 pages.
(Continued)

*Primary Examiner* — Yoshitoshi Takeuchi
(74) *Attorney, Agent, or Firm* — Lewis Roca Rothgerber Christie LLP

(57) ABSTRACT

A battery module is provided. The battery module includes: first and second bus bars arranged adjacent to each other to electrically connect battery packs adjacent to each other; and a bus bar cover covering and insulating the first and second bus bars from the outside thereof and insulating the first and second bus bars from each other, wherein the bus bar cover includes a hollow portion exposing a coupling hole of the first and second bus bars. Accordingly, sufficient insulation may be secured for the bus bars electrically connecting different battery packs, malfunction and safety accidents caused by the short circuit of the bus bars through which high-voltage charge/discharge currents flow may be prevented, and the insulation structure of the bus bars may be simplified by accommodating different adjacent bus bars together.

16 Claims, 7 Drawing Sheets

(51) Int. Cl.
    *H01M 50/503*     (2021.01)
    *H01M 50/20*     (2021.01)
    *H01M 50/50*     (2021.01)

(56) References Cited

U.S. PATENT DOCUMENTS

| | | | |
|---|---|---|---|
| 8,709,628 | B2 | 4/2014 | Carignan et al. |
| 8,936,865 | B2 | 1/2015 | Kim |
| 9,005,800 | B2 | 4/2015 | Park et al. |
| 9,017,857 | B2 | 4/2015 | Lee et al. |
| 9,054,359 | B2 | 6/2015 | Han et al. |
| 9,172,068 | B2 | 10/2015 | Kim |
| 9,318,752 | B2 | 4/2016 | Kim et al. |
| 9,508,464 | B2 | 11/2016 | Nakayama |
| 9,548,484 | B2 | 1/2017 | Tanaka et al. |
| 9,608,298 | B2 | 3/2017 | Jeong et al. |
| 2011/0223466 | A1 | 9/2011 | Lee et al. |
| 2013/0137313 | A1 | 5/2013 | Casses et al. |
| 2014/0017533 | A1 | 1/2014 | Nishihara et al. |
| 2014/0111161 | A1 | 4/2014 | Kim |
| 2014/0158396 | A1 | 6/2014 | Nakayama |
| 2015/0086834 | A1 | 3/2015 | Cho |
| 2015/0136438 | A1* | 5/2015 | Lumetta ............ H01M 2/202 |
| | | | 174/68.2 |

FOREIGN PATENT DOCUMENTS

| | | |
|---|---|---|
| CN | 104466067 A | 3/2015 |
| CN | 104659628 A | 5/2015 |
| JP | 2855041 B2 | 9/1994 |
| JP | 2521746 Y2 | 10/1996 |
| JP | 9-106802 A | 4/1997 |
| JP | 11-167911 A | 6/1999 |
| JP | 2012-38558 A | 2/2012 |
| JP | 2012-138333 A | 7/2012 |
| JP | 2013-37988 A | 2/2013 |
| JP | 2013-62103 A | 4/2013 |
| JP | 2013-168387 A | 8/2013 |
| JP | 2013-533586 A | 8/2013 |
| JP | 2013-536974 A | 9/2013 |
| JP | 2014-160679 A | 9/2014 |
| JP | 2014-165102 A | 9/2014 |
| JP | 2015-106531 A | 6/2015 |
| JP | 2015-149213 A | 8/2015 |
| KR | 10-2010-0070170 A | 6/2010 |
| KR | 10-2011-0044129 A | 4/2011 |
| KR | 10-2011-0044130 A | 4/2011 |
| KR | 10-1084213 B1 | 11/2011 |
| KR | 10-1087036 | 11/2011 |
| KR | 10-2012-0050112 A | 5/2012 |
| KR | 10-2014-0052519 A | 5/2014 |
| KR | 10-1405808 B1 | 6/2014 |

OTHER PUBLICATIONS

EPO Extended Search Report dated Mar. 4, 2020, for corresponding European Patent Application No. 17831289.8 (7 pages).
Korean Notice of Allowance dated Mar. 10, 2020, for corresponding Korean Patent Application No. 10-2016-0092886 (2 pages).
International Search Report for corresponding International Application No. PCT/KR2017/007641, dated Nov. 28, 2017, 5pp.
Written Opinion for corresponding International Application No. PCT/KR2017/007641, dated Nov. 28, 2017, 4pp.
International Search Report for corresponding International Application No. PCT/KR2017/007639, dated Oct. 23, 2017, 5pp.
Written Opinion for corresponding International Application No. PCT/KR2017/007639, dated Oct. 23, 2017, 5pp.
EPO Extended Search Report dated Feb. 12, 2020, for corresponding European Patent Application No. 17831288.0, 7 pages.
Korean Office Action dated Jun. 9, 2020, for corresponding Korean Patent Application No. 10-2016-0092884 (4 pages).
U.S. Office Action dated Dec. 21, 2020, issued in U.S. Appl. No. 16/318,964 (12 pages).
Chinese Office Action, corresponding to Application No. 201780045126.2, dated Jan. 4, 2021, 7 pages.
*English Translation* of Chinese Office Action, corresponding to Application No. 201780045126.2, dated Jan. 4, 2021, 11 pages.
U.S. Final Office Action dated Jun. 9, 2021, issued in U.S. Appl. No. 16/318,964 (13 pages).
Chinese Office action for Application No. 201780045163.3, dated Jan. 26, 2021, 13 pages.
Chinese Office Action, with English translation, dated Jul. 13, 2021, issued in corresponding Chinese Patent Application No. 201780045163.3 (9 pages).
U.S. Advisory Action dated Aug. 25, 2021, issued in U.S. Appl. No. 16/318,964 (3 pages).
U.S. Office Action dated Sep. 15, 2021, issued in U.S. Appl. No. 16/318,964 (16 pages).

* cited by examiner

BATTERY MODULE

CROSS-REFERENCE TO RELATED APPLICATION(S)

This application is a National Phase Patent Application of International Patent Application Number PCT/KR2017/007641, filed on Jul. 17, 2017, which claims priority of Korean Patent Application No. 10-2016-0092886, filed Jul. 21, 2016. The entire contents of both of which are incorporated herein by reference.

TECHNICAL FIELD

The present disclosure relates to battery modules.

BACKGROUND ART

In general, secondary batteries are rechargeable, unlike primary batteries. Secondary batteries may be used as energy sources in mobile devices, electric vehicles, hybrid vehicles, electric bicycles, uninterruptible power supplies, or the like. Depending on the types of external devices to which they are applied, the secondary batteries may be used as a single battery or as a battery module in which a plurality of batteries are electrically connected and combined into one unit.

A small mobile device such as a mobile phone may operate for a certain time according to the output and capacity of a single battery. However, in the case of long-time driving or high-power driving such as in the case of an electric vehicle or a hybrid vehicle with high power consumption, a battery module may be preferred due to output and capacity issues. The battery module may increase the output voltage or the output current according to the number of built-in batteries.

The background art of the present disclosure is disclosed in Japanese Laid-open Patent Publication No. 2013-168387.

DESCRIPTION OF EMBODIMENTS

Technical Problem

Provided is a battery module that may secure sufficient insulation for bus bars electrically connecting different battery packs and may prevent malfunction and safety accidents caused by the short circuit of bus bars through which high-voltage charge/discharge currents flow.

Also, provided is a battery module that may simplify the insulation structure of bus bars by accommodating different adjacent bus bars together.

Solution to Problem

According to an aspect of the present disclosure, a battery module includes: first and second bus bars arranged adjacent to each other to electrically connect battery packs adjacent to each other; and a bus bar cover covering and insulating the first and second bus bars from the outside thereof and insulating the first and second bus bars from each other, wherein the bus bar cover includes a hollow portion exposing a coupling hole of the first and second bus bars.

Advantageous Effects of Disclosure

According to an embodiment of the present disclosure, sufficient insulation may be secured for the bus bars forming charge/discharge paths and a short circuit with respect to the external environment or the internal configuration may be prevented and thus malfunction of the battery module and unexpected safety accidents may be prevented.

In particular, by providing the bus bar cover that may accommodate and insulate different adjacent bus bars together, a separate insulation structure may not need to be provided for each bus bar and the different adjacent bus bars may be collectively and simultaneously isolated through one operation. As a result, according to an embodiment of the present disclosure, the bus bar insulation structure may be simplified in the battery module requiring a plurality of bus bars and the manufacturing cost thereof may be reduced.

BEST MODE

Figure 1:
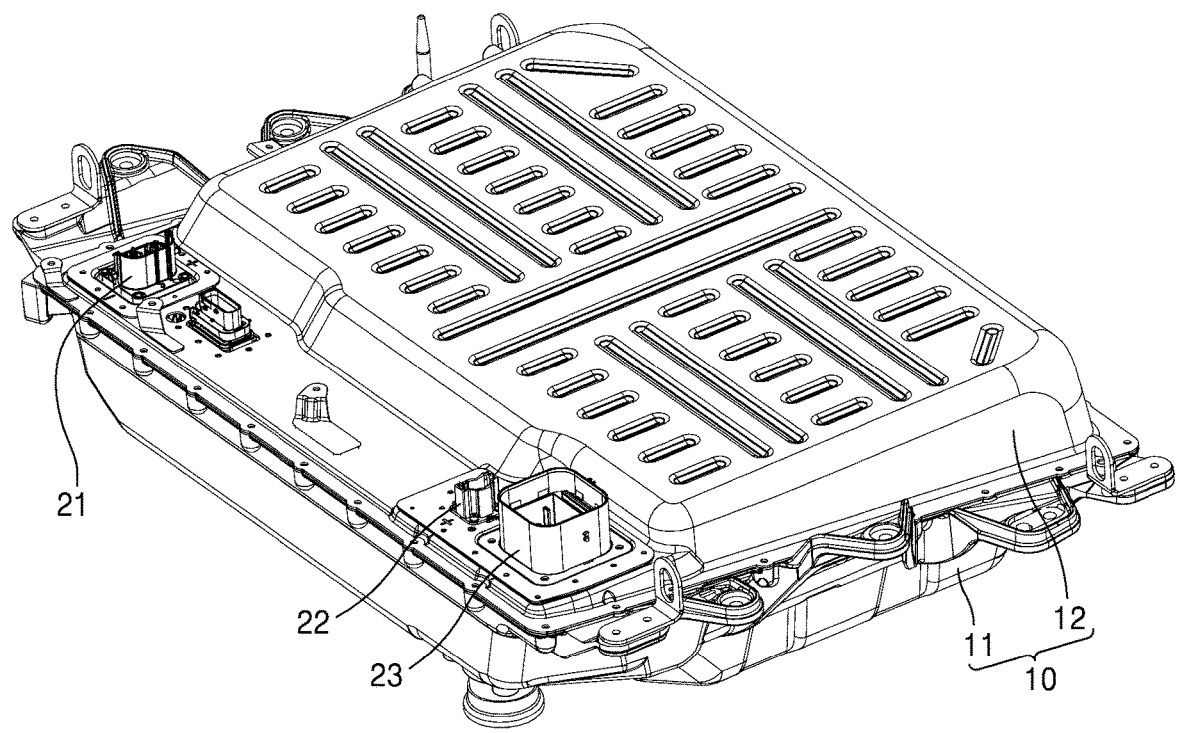
FIG. 1 illustrates a perspective view of a battery module according to an embodiment of the present disclosure.

According to an embodiment of the present disclosure, a battery module includes: first and second bus bars arranged adjacent to each other to electrically connect battery packs adjacent to each other; and a bus bar cover covering and insulating the first and second bus bars from the outside thereof and insulating the first and second bus bars from each other, wherein the bus bar cover includes a hollow portion exposing a coupling hole of the first and second bus bars.

For example, the hollow portion may be formed in a cylindrical shape extending in a direction away from the bus bar.

For example, the bus bar cover further may include an internal insulating wall formed between the first and second bus bars.

For example, the bus bar cover may further include an external insulating wall covering the outside of the first and second bus bars at a position facing the internal insulating wall.

For example, the internal insulating wall and the external insulating wall may be formed wider than the first and second bus bars.

For example, the external insulating wall may include a pair of external insulating walls arranged to face each other with the internal insulating wall therebetween.

For example, the bus bar cover may further include: a base portion extending in a length direction of the first and second bus bars and covering a portion between coupling holes of the first and second bus bars; and a pivoting wing portion pivotably connected to the base portion to cover each end portion of the first and second bus bars.

For example, the pivoting wing portion may include a pair of pivoting wing portions pivoting in opposite directions and covering both end portions in the length direction of the first and second bus bars.

For example, a hinge portion supporting a pivoting operation of the pivoting wing portion may be formed between the base portion and the pivoting wing portion.

For example, the bus bar cover may further include: an internal insulating wall extending from the base portion between the first and second bus bars; and an external insulating wall extending from the base portion to a position facing the internal insulating wall and covering the outside of the first and second bus bars.

For example, the pivoting wing portion and the external insulating wall may be coupled to each other to cover the outside of the first and second bus bars together.

For example, the internal insulating wall may be formed long to cover an entire length of the first and second bus bars, and the external insulating wall may be formed shorter than the internal insulating wall.

For example, the pivoting wing portion and the external insulating wall may be hook-coupled to each other.

For example, the bus bar cover may further include an extension insulating wall extending from the base portion to cover a longitudinal section of the first and second bus bars, and the longitudinal section of the first and second bus bars may be overlappingly covered by the extension insulating wall and the pivoting wing portion.

For example, the hollow portion may include four hollow portions exposing two pairs of coupling holes formed at both end portions of the first and second bus bars, respectively.

For example, the bus bar cover may further include a base portion extending in a length direction of the first and second bus bars and covering a portion between coupling holes of the first and second bus bars, and a hinge portion supporting a pivoting operation of the hollow portion may be formed between the hollow portion and the base portion.

For example, a pair of hollow portions formed respectively on both sides of the base portion may not be arranged on the same plane.

For example, the bus bar cover may be integrally formed of an insulating material.

MODE OF DISCLOSURE

Hereinafter, battery modules according to example embodiments of the present disclosure will be described with reference to the accompanying drawings.

Figure 2:
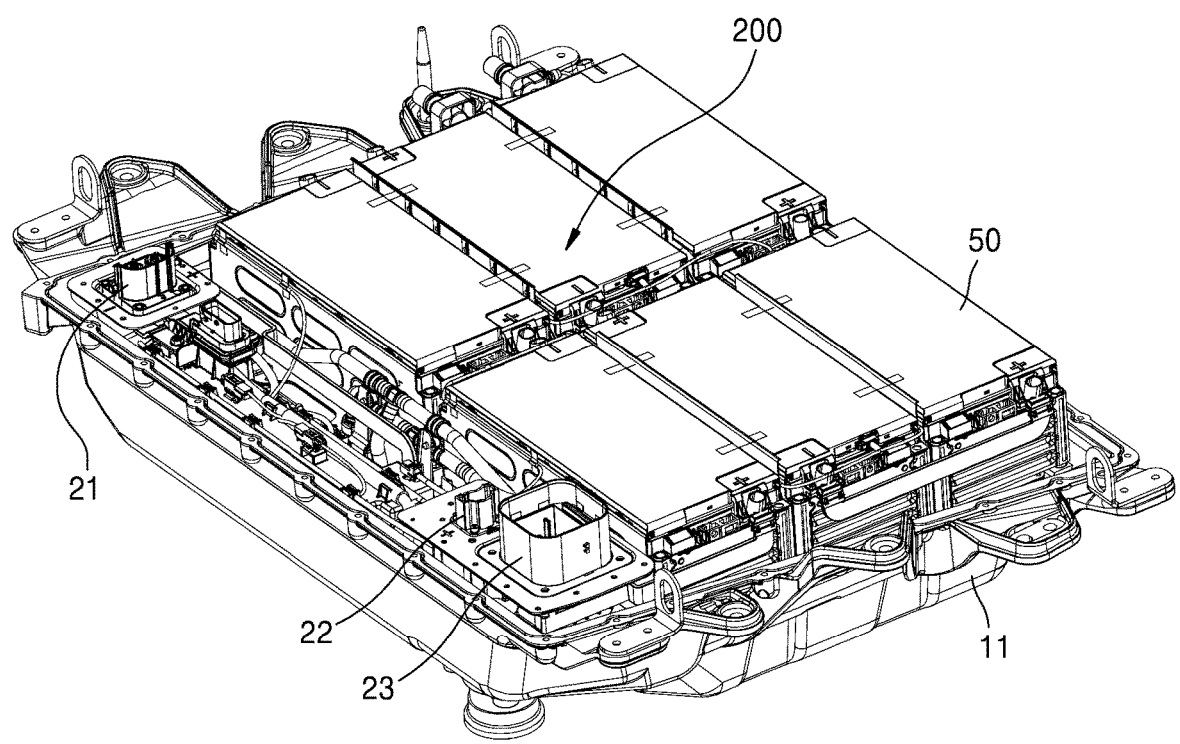
FIG. 2 illustrates a perspective view of the battery module illustrated in FIG. 1.

FIG. 1 illustrates a perspective view of a battery module according to an embodiment of the present disclosure. FIG. 2 illustrates a perspective view of the battery module illustrated in FIG. 1.

Referring to the drawings, the battery module may include a battery pack 50 and a housing 10 for accommodating the battery pack 50. For example, the housing 10 may include a frame 11 and a cover 12 covering the frame 11, which are coupled in opposite directions with a plurality of battery packs 50 therebetween. In an embodiment of the present disclosure, the battery pack 50 may include a plurality of battery packs 50. For example, the plurality of battery packs 50 may be electrically connected to each other, and a plurality of battery packs 50 may be electrically connected to each other in a serial manner, in a parallel manner, or in a serial-parallel hybrid manner to provide a desired electrical output. Adjacent battery packs 50 may be electrically connected to each other by using a bus bar 200.

Referring to FIGS. 1 and 2, the battery module may include a high-voltage connector 21 exposed outside the housing 10. For example, the high-voltage connector 21 may be formed on the frame 11 and may be formed to protrude above the cover 12 from the top of the frame 11. The battery module may provide driving power for a vehicle, and the high-voltage connector 21 may form an output terminal for supplying the driving power.

On the frame 11, it may include a circuit unit for controlling a charge/discharge operation of the battery pack 50, an auxiliary connector 22 for outputting a current of the battery pack 50, and a fuse block 23 for selectively blocking a current of the battery pack 50 in case of malfunction.

The auxiliary connector 22 may be exposed from the cover 12. The battery module may provide driving power for a vehicle, and the auxiliary connector 22 may supply driving power for in-vehicle electronics, not the driving power for the vehicle. The fuse block 23 may be exposed from the cover 12. In this case, a fuse box (not illustrated) forming a charge/discharge path of the battery pack 50 may be coupled onto the fuse block 23. The fuse box (not illustrated) may be formed on the charge/discharge path and may block a charge/discharge current in case of malfunction such as overheat or overcurrent. The fuse box (not illustrated) may include, for example, a variable resistor, the resistance of which varies according to temperature, or a fuse capable of blocking the charge/discharge path according to Joule heating. By coupling the fuse box (not illustrated) onto the fuse block 23, the charge/discharge path may be formed and the preparation for driving the battery module may be completed.

The cover 12 may cover the frame 11 on which the high-voltage connector 21, the auxiliary connector 22, and the fuse block 23 are seated. In this case, the cover 12 may include an opening portion for exposing the high-voltage connector 21, the auxiliary connector 22, and the fuse block 23.

Figure 3:
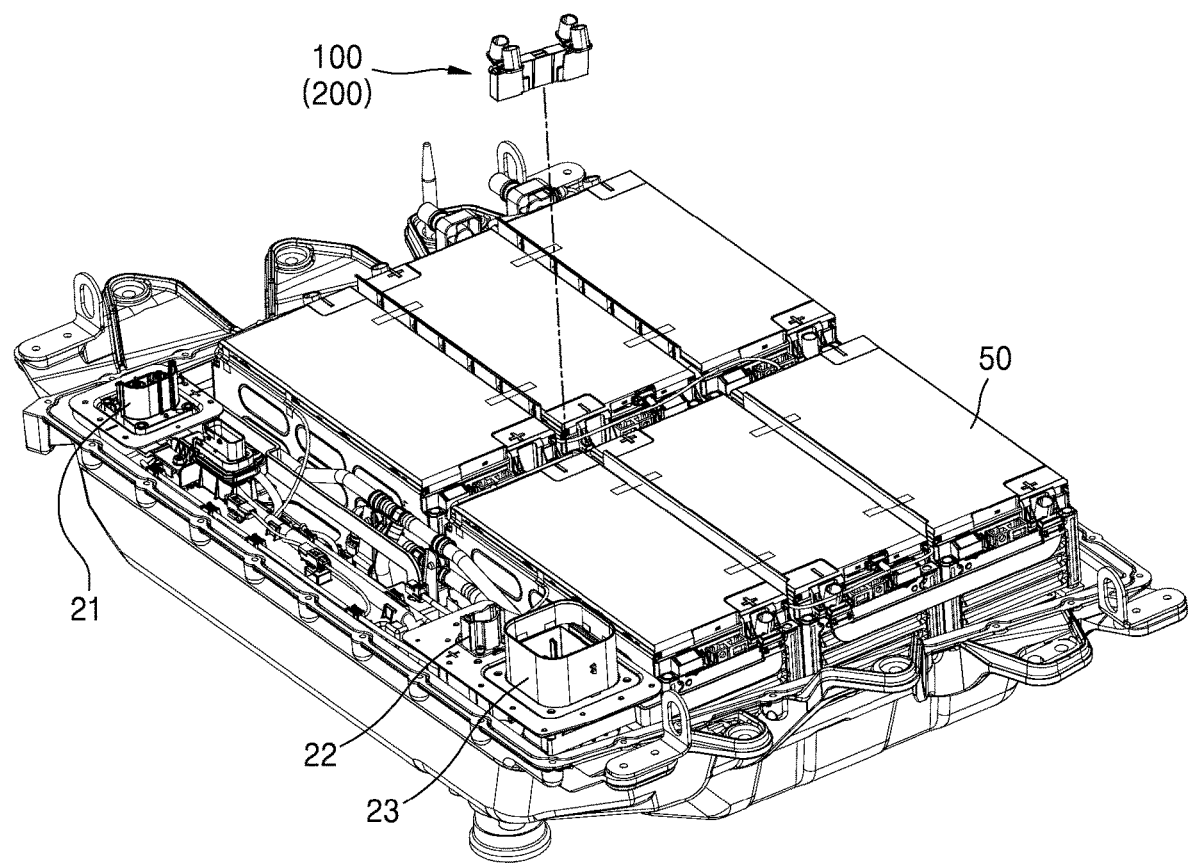
FIG. 3 illustrates a perspective view of a portion of the battery module illustrated in FIG. 1.
Figure 4:
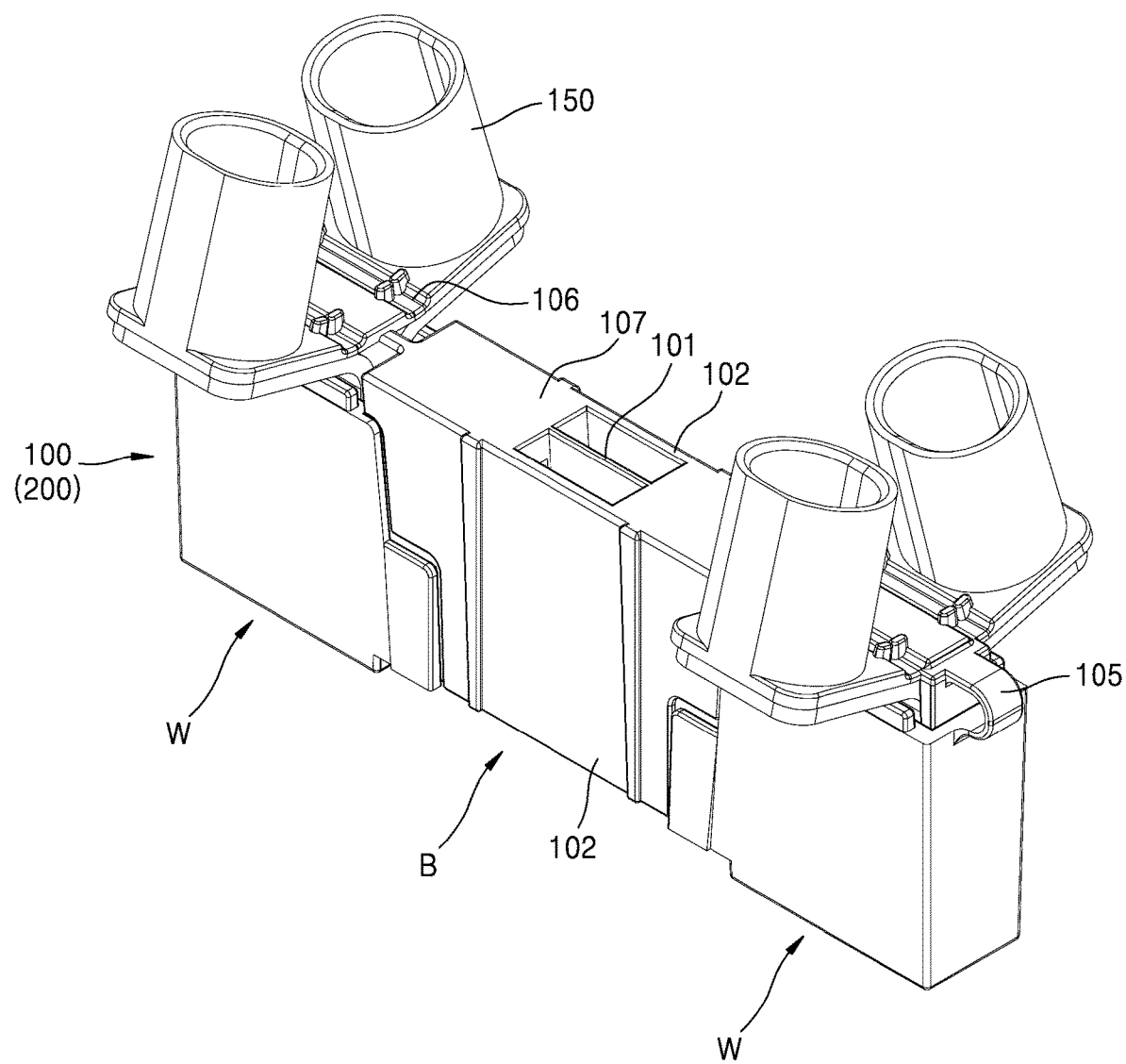
FIG. 4 illustrates a perspective view of a bus bar and a bus bar cover illustrated in FIG. 3.
Figure 5:
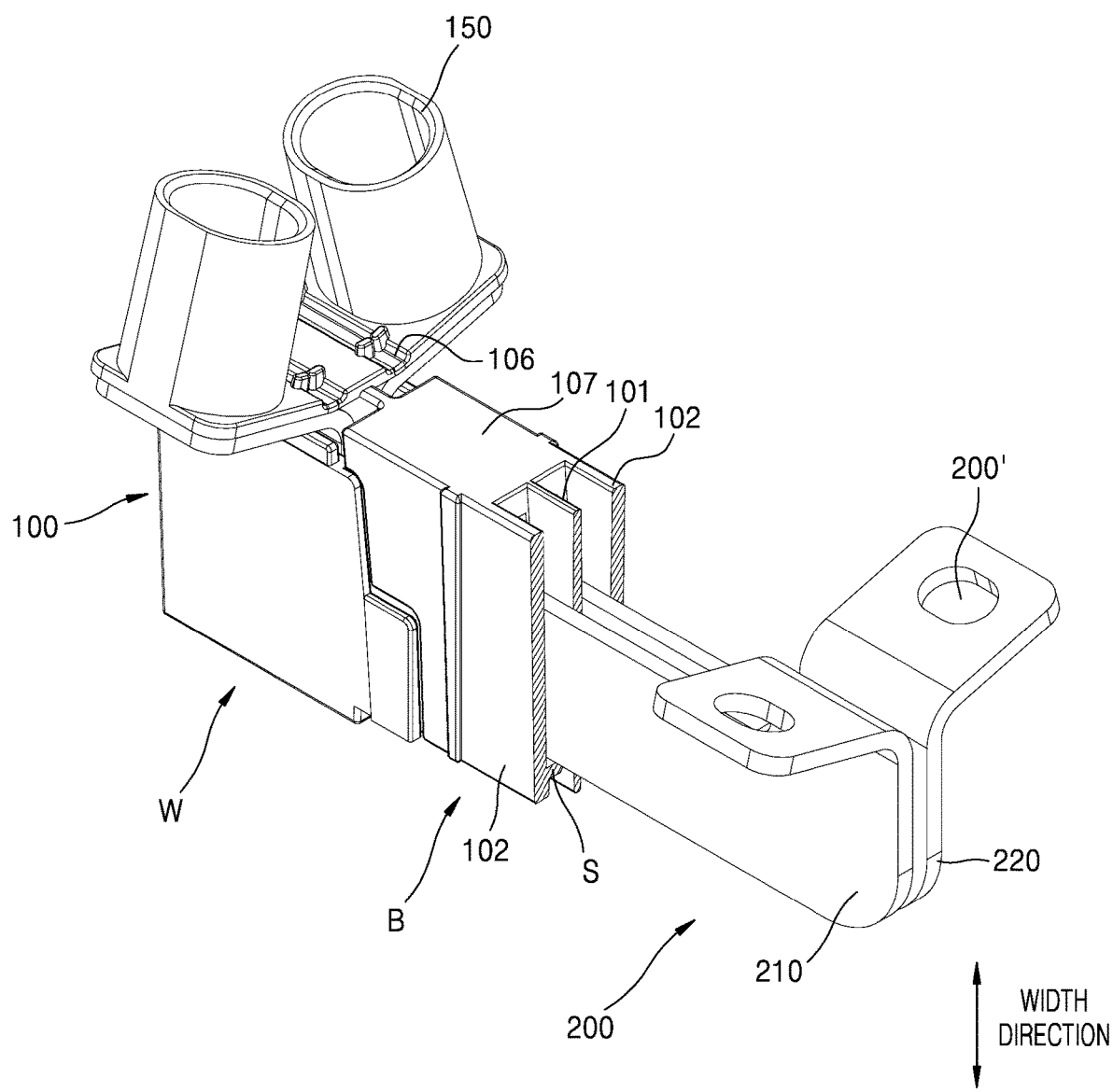
FIGS. 5 to 7 illustrate perspective views illustrating the assembly state of the bus bar and the bus bar cover illustrated in FIG. 3.
Figure 6:
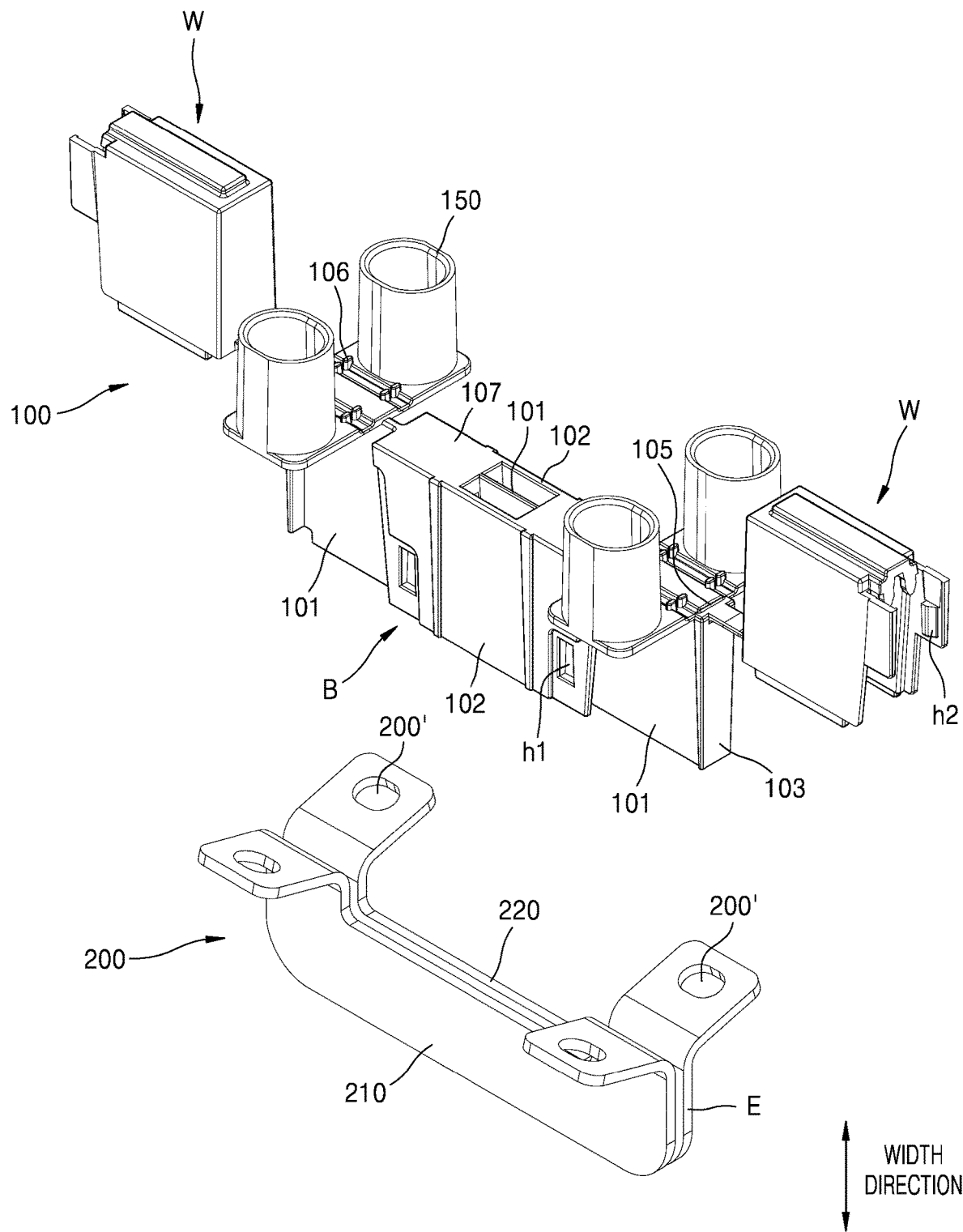
Figure 7:
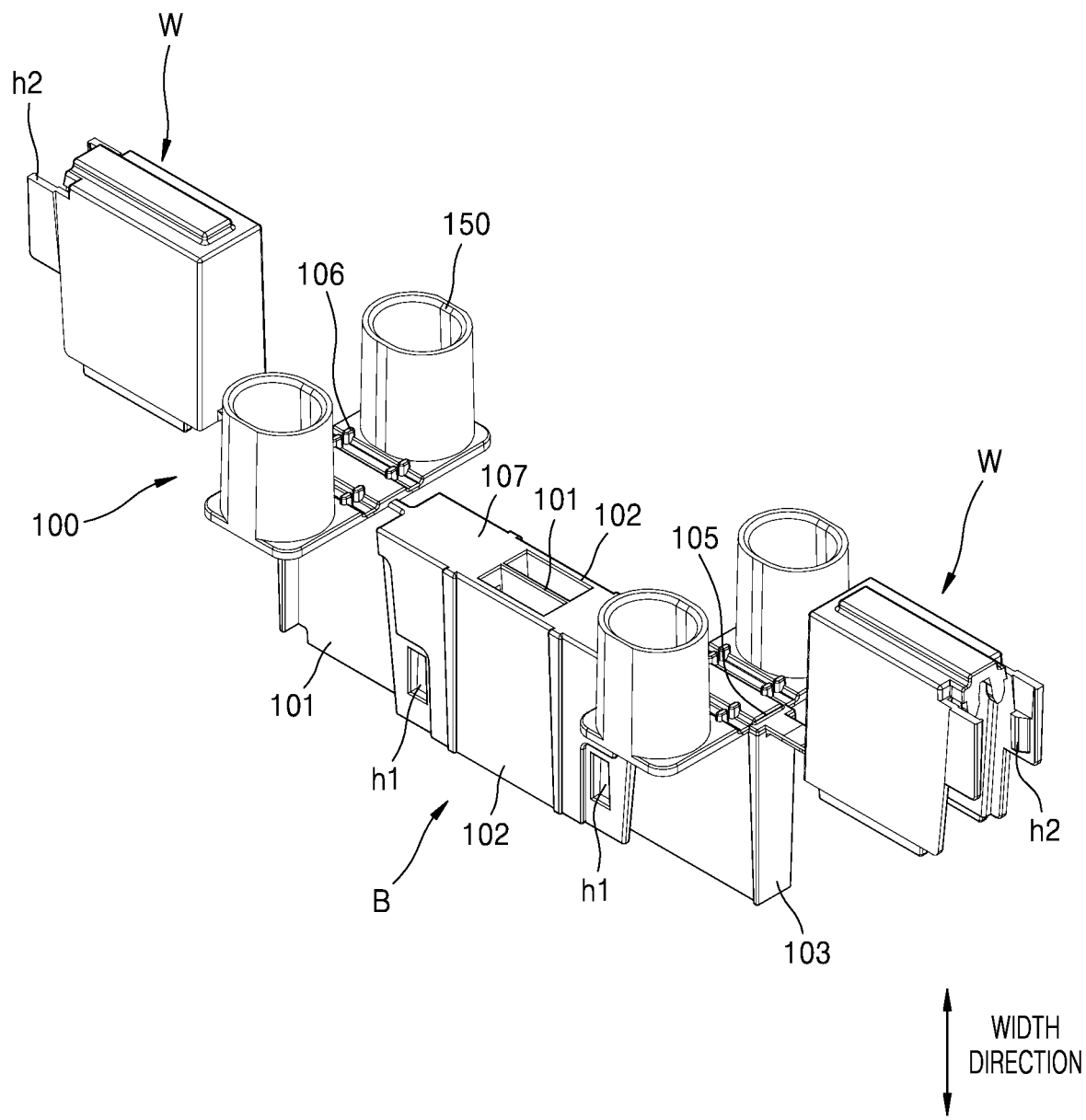
Figure 8:
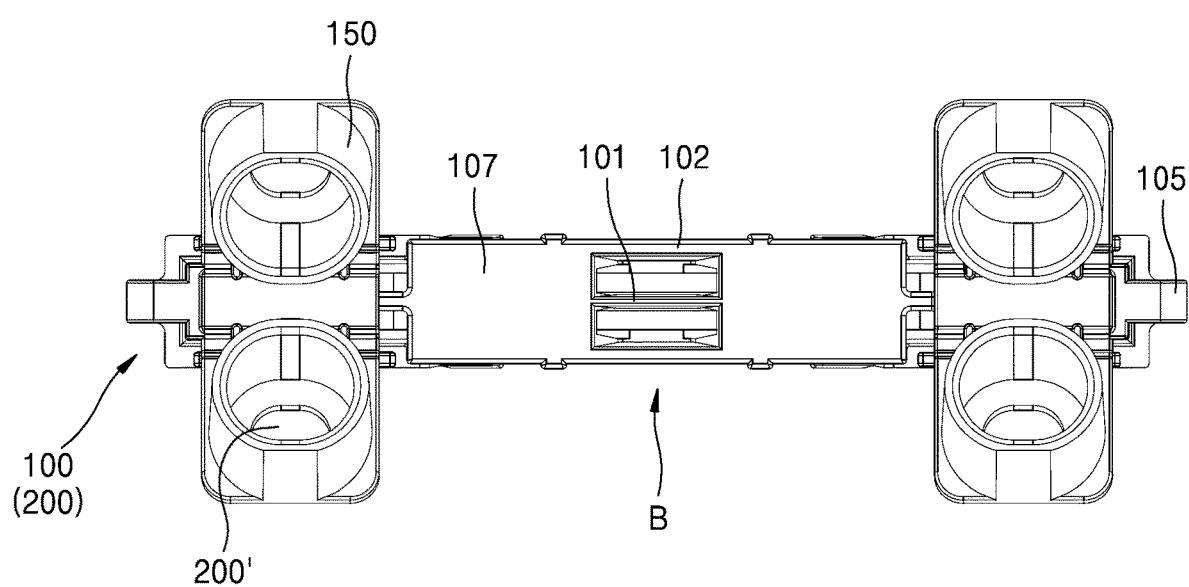
FIG. 8 illustrates a top surface of the bus bar and the bus bar cover illustrated in FIG. 3.

FIG. 3 illustrates a perspective view of a portion of the battery module illustrated in FIG. 1. FIG. 4 illustrates a perspective view of a bus bar and a bus bar cover illustrated in FIG. 3. FIGS. 5 to 7 illustrate perspective views illustrating the assembly state of the bus bar and the bus bar cover illustrated in FIG. 3. FIG. 8 illustrates a top surface of the bus bar and the bus bar cover illustrated in FIG. 3.

Referring to FIGS. 3, 5, and 6, different battery packs 50 may be electrically connected to each other by the bus bar 200. The bus bar 200 may include first and second bus bars 210 and 220 adjacent to each other. Each of the first and second bus bars 210 and 220 may electrically connect battery packs 50 adjacent to each other. For example, the first bus bar 210 may electrically connect a pair of battery packs 50 adjacent to each other in the length direction of the first bus bar 210, and a coupling hole 200' to be coupled to each battery pack 50 may be formed at each of both ends in the length direction of the first bus bar 210. The first bus bar 210 and each battery pack 50 may be electrically connected to each other by a fastening member (not illustrated) coupled to the coupling hole 200' at each of both ends of the first bus bar 210. Similarly, the second bus bar 220 may electrically connect another pair of battery packs 50 adjacent to each other in the length direction of the second bus bar 220. For example, the second bus bar 220 may electrically connect a pair of battery packs 50 adjacent to each other in the length direction of the second bus bar 220, and a coupling hole 200' to be coupled to each battery pack 50 may be formed at each of both ends in the length direction of the second bus bar 220. The second bus bar 220 and each battery pack 50 may be electrically connected to each other by a fastening member (not illustrated) coupled to the coupling hole 200' at each of both ends of the second bus bar 220.

As described below, the first and second bus bars 210 and 220 may be covered by one bus bar cover 100. Accordingly, the first and second bus bars 210 and 220 insulated by one bus bar cover 100 may electrically connect two pairs of adjacent battery packs 50 to each other and thus may electrically connect a total of four battery packs 50. Since the first and second bus bars 210 and 220 form paths of charge/discharge currents of different voltages, the first and second bus bars 210 and 220 may be insulated from each other by the bus bar cover 100. In other words, the bus bar cover 100 may insulate the first and second bus bars 210 and 220 from each other and simultaneously insulate the first and second bus bars 210 and 220 from the external environment. Since a high-voltage charge/discharge current flows through the first and second bus bars 210 and 220, when the first and second bus bars 210 and 220 are short-circuited to each other or short-circuited to the external configuration, a normal charge/discharge operation may become impossible and also there may be a risk of an accident such as ignition or explosion. According to the present disclosure, by the insulation of the bus bar 200, an erroneous charge/discharge operation may be prevented and the occurrence of an accident may be prevented. Particular technical details of the bus bar cover 100 will be described below.

The bus bar cover 100 may accommodate the adjacent first and second bus bars 210 and 220 together. As bus bars arranged adjacent to each other, the first and second bus bars 210 and 220 may electrically connect different pairs of battery packs 50, respectively. For example, each of the first and second bus bars 210 and 220 may include coupling holes 200' for electrically connecting different battery packs 50. For example, each of the first and second bus bars 210 and 220 may include the coupling holes 200' formed at both ends in the length direction thereof. The respective coupling holes 200' may provide coupling positions for the different battery packs 50.

A bus bar cover 100 may cover the first and second bus bars 210 and 220. The bus bar cover 100 may include four hollow portions 150 to expose a total of four coupling holes 200', that is, two coupling holes 200' formed at each of the first and second bus bars 210 and 220.

For example, the bus bar cover 100 may be coupled to the first and second bus bars 210 and 220 adjacent to each other and may expose a pair of coupling holes 200' formed at both ends of each of the first and second bus bars 210 and 220. As described below, the bus bar cover 100 may accommodate the first and second bus bars 210 and 220 adjacent to each other and insulate the first and second bus bars 210 and 220 from each other. The bus bar cover 100 may accommodate the first and second bus bars 210 and 220 adjacent to each other, thereby simplifying the insulation structure of the bus bar 200. That is, since the bus bar cover 100 collectively insulates the first and second bus bars 210 and 220, a separate insulation structure may not need to be provided for each bus bar 200 and the first and second bus bars 210 and 220 may be simultaneously insulated through one operation. The bus bar cover 100 will be described below in more detail.

The bus bar cover 100 may include a cover body B and a pivoting wing portion W pivotably connected to the cover body B. Throughout this specification, the cover body B may collectively refer to all portions of the bus bar cover 100 other than the pivoting wing portions W.

The cover body B may include a base portion 107 covering a top surface of the bus bar 200, an internal insulating wall 101 and an external insulating wall 102 extending from the base portion 107, and an extension insulating wall 103 covering a longitudinal section E of the bus bar 200.

The base portion 107 may cover the top surface of the bus bar 200 and may cover the bus bar 200 while extending in the length direction of the bus bar 200. The base portion 107 may be formed as a slender-type plate member extending in the length direction of the bus bar 200 to correspond to the top surface of the bus bar 200. Hollow portions 150 may be formed on both sides of the base portion 107, and the base portion 107 may cover and insulate a portion of the bus bar 200 between the hollow portions 150 formed on both sides thereof. For example, the base portion 107 may cover and insulate a portion between the coupling holes 200' of the first and second bus bars 210 and 220.

The extension insulating wall 103 may cover and insulate the longitudinal section E of each of both sides in the length direction of the bus bar 200. The extension insulating wall 103 may be formed in a bent shape to extend from the base portion 107 and cover the longitudinal section E of the bus bar 200.

The cover body B may include at least three insulating walls 101, 102, and 103. That is, the cover body B may include an internal insulating wall 101 extending from the base portion 107 between the first and second bus bars 210 and 220 and an external insulating wall 102 extending from the base portion 107 to a position facing the internal insulating wall 101 and cover the outside of the first and second bus bars 210 and 220.

More particularly, the cover body B may accommodate the first and second bus bars 210 and 220 adjacent to each other and, in this case, may include an internal insulating wall 101 for providing insulation between the adjacent first and second bus bars 210 and 220 and an external insulating wall 102 for covering the outside of the first and second bus bars 210 and 220. The internal insulating wall 101 may be formed to enough thickness and width to prevent electrical interference between the first and second bus bars 210 and 220 adjacent to each other. In order to secure sufficient insulation between the first and second bus bars 210 and 220, the internal insulating wall 101 may be formed sufficiently thick.

The internal insulating wall 101 between the first and second bus bars 210 and 220 may be formed to a sufficient width (in the width direction). For example, since a high-voltage charge/discharge current flows through the first and second bus bars 210 and 220, when the width of the internal insulating wall 101 is insufficient, the charge/discharge current may flow in the width direction. That is, in order for the internal insulating wall 101 to exhibit a sufficient insulation function between the first and second bus bars 210 and 220, the internal insulating wall 101 may be formed to have a sufficient width as well as a sufficient thickness to provide sufficient isolation between the second bus bars 210 and 220 in the width direction. At least the internal insulating wall 101 may be formed to a greater width than the first and second bus bars 210 and 220.

An external insulating wall 102 may be formed at a position facing the internal insulating wall 101. For example, the external insulating wall 102 may include a pair of external insulating walls 102 formed at opposite positions with the internal insulating wall 101 therebetween. The pair of external insulating walls 102 may cover and insulate the outsides of the adjacent first and second bus bars 210 and 220, respectively. The external insulating wall 102 may be formed to an equal width (in the width direction) with the internal insulating wall 101 to face the internal insulating wall 101.

As described above, the internal insulating wall 101 may be formed wide to a certain width or greater (in the width direction) to provide sufficient insulation between the first and second bus bars 210 and 220 adjacent to each other, and the external insulating wall 102 may be formed to an equal width with the internal insulating wall 101 at a position facing the internal insulating wall 101. As such, since the external insulating wall 102 is formed sufficiently wide to an equal width with the internal insulating wall 101, sufficient insulation may be provided for the first and second bus bars 210 and 220. For example, the internal insulating wall 101 and the external insulating wall 102 may be generally formed to an equal width (in the width direction). That is, the external insulating wall 102 may be formed to a sufficient width such that a portion of the first and second bus bars 210 and 220 may not be exposed or a portion of the internal insulating wall 101 may not be exposed through the external insulating wall 102.

Since the internal insulating wall 101 and the external insulating wall 102 are formed at least wider than the bus bar 200, exposure of the bus bar 200 may be effectively prevented. For example, the bottom surface of the bus bar 200 may be exposed from the bus bar cover 100, and the side surface of the bus bar 200 may be prevented from being exposed through the external insulating wall 102 formed wider than the bus bar 200. Unlike the bottom surface of the bus bar 200, when the side surface of the bus bar 200 is exposed, there may be a high possibility that the bus bar 200 will be short-circuited to an adjacent configuration or an external penetrant.

A locking jaw S (see FIG. 5) may be formed at the external insulating wall 102 so as to be fixed to the first and second bus bars 210 and 220. For example, a hook-shaped locking jaw S capable of being hung on the bottom surface of the first and second bus bars 210 and 220 may be formed at the internal surface of the external insulating wall 102. Accordingly, the locking jaw S of the external insulating wall 102 covering the first bus bar 210 may be located to support the bottom surface of the first bus bar 210, and the locking jaw S of the external insulating wall 102 covering the second bus bar 220 may be located to support the bottom surface of the second bus bar 220. Since the bottom surfaces of the first and second bus bars 210 and 220 are hung and fixed onto the locking jaws S formed on the respective external insulating walls 102, separation between the bus bar 200 and the bus bar cover 100 may be prevented.

For example, the bottom surface of the bus bar 200 may be exposed from the bus bar cover 100. In this case, since the locking jaw S is formed at the internal surface of the external insulating wall 102, separation between the bus bar cover 100 and the bus bar 200 may be prevented. The bus bar 200 may form a high-voltage high-current charge/discharge path, and a large amount of heat may be accumulated according to Joule heating. Accordingly, the bus bar cover 100 may provide an advantageous structure for heat dissipation of the bus bar 200 by exposing the bottom surface of the bus bar 200 and may also prevent separation from the bus bar cover 100 by forming the locking jaw S at the external insulating wall 102.

The internal insulating wall 101 and the external insulating wall 102 may extend in the length direction of the bus bar cover 100. In this case, the internal insulating wall 101 and the external insulating wall 102 may have different extension lengths. More particularly, the internal insulating wall 101 may extend longer than the external insulating wall 102. The internal insulating wall 101 may be formed substantially over the entire length of the bus bar 200. In other words, the internal insulating wall 101 may be formed entirely between the first and second bus bars 210 and 220 to provide insulation between the first and second bus bars 210 and 220. Unlike the internal insulating wall 101, the external insulating wall 102 may be formed shorter than the first and second bus bars 210 and 220. As described below, the external insulating wall 102 may insulate the outside of the first and second bus bars 210 and 220 together with the pivoting wing portion W pivotably connected to the cover body B. In summary, while the internal insulating wall 101 may extend sufficiently long to provide insulation between the first and second bus bars 210 and 220, the external insulating wall 102 may be formed to a relatively small length because it may insulate the outside of the first and second bus bars 210 and 220 in cooperation with the pivoting wing portion W.

A hook coupling portion h1 may be formed at the external surface of the external insulating wall 102. The hook coupling portion h1 may be coupled with a hook coupling portion h2 of the pivoting wing portion W to fix the pivoting wing portion W. For example, any one of the hook coupling portions h1 and h2 of the external insulating wall 102 and the pivoting wing portion W may be formed as an assembly protrusion, and the other one thereof may be formed as a hole into which the assembly protrusion is to be inserted. In an embodiment of the present disclosure, the hook coupling portion h1 of the external insulating wall 102 may be formed as a hole, and the hook coupling portion h2 of the pivoting wing portion W may be formed as an assembly protrusion that is to be inserted into the hole. As described below, the pivoting wing portion W pivotably assembled to the cover body B may be hook-coupled with the cover body B (the external insulating wall 102) to be fixed to prevent the exposure of the bus bar 200 according to arbitrary pivoting thereof.

An extension insulating wall 103 for covering the longitudinal section E of the bus bar 200 may be formed at each of both ends of the base portion 107. More particularly, the extension insulating wall 103 may be formed at each of both ends of the base portion 107 in the length direction of the bus bar 200 and may be bent from the base portion 107 to cover and insulate the longitudinal section E of the bus bar 200. As described below, the longitudinal section E of the bus bar 200 may be insulated by the pivoting wing portion W as well as by the extension insulating wall 103. For example, the longitudinal section E of the bus bar 200 may be overlappingly insulated by the extension insulating wall 103 and the pivoting wing portion W.

A hollow portion 150 open to a coupling hole 200' may be formed on each of both sides of the base portion 107. The hollow portion 150 may allow a fastening operation through the coupling hole 200' by exposing the coupling hole 200' and may also isolate the bus bar 200 from the external environment by extending long to a certain height or more in a direction away from the bus bar 200. For example, the hollow portion 150 may prevent the short circuit of the bus bar 200 by insulating the bus bar 200 from the external environment. The hollow portion 150 may be formed in a narrow and long cylindrical shape to block external penetration while being sufficient to expose the coupling hole 200' of the bus bar 200. More particularly, the hollow portion 150 may be formed in a hollow cylindrical shape along the outer circumference of the coupling hole 200' while surrounding the coupling hole 200'.

For example, an external object (not illustrated) approaching the coupling hole 200' may be blocked by the hollow portion 150 to be prevented from directly contacting the bus bar 200 and to be isolated from the bus bar 200 by a certain distance or more.

The hollow portion 150 may include four hollow portions 150 corresponding to a total of four coupling holes 200', that is, a pair of coupling holes 200' provided at each of the first and second bus bars 210 and 220 adjacent to each other. Each hollow portion 150 may extend long to a certain height or more in a direction away from the bus bar 200 in order to prevent the short circuit of the exposed bus bar 200 while exposing each coupling hole 200'. By the height of the hollow portion 150, the hollow portion 150 may isolate the bus bar 200 in order to block external penetration toward the bus bar 200. The hollow portion 150 may be provided as a narrow and long cylindrical member in order to block other external penetration while allowing the approach of a fastening tool (not illustrated) for fastening with respect to the coupling hole 200'.

A hinge portion 106 may be formed between the base portion 107 and the hollow portion 150. The hinge portion 106 may connect the base portion 107 and the hollow portion 150 pivotably with respect to each other. For example, the hollow portions 150 may be arranged on different planes on both sides of the base portion 107. The hollow portion 150 may be closely adhered onto each bus bar 200 through a hinge portion 106 that is adaptively adjusted to the shape of the bus bar 200. For example, the hinge portion 106 may provide a relatively freely-bendable coupling with respect to the base portion 107. The hinge portion 106 may provide a free pivoting with respect to the base portion 107 such that each hollow portion 150 may be closely adhered onto the bus bar 200.

Portions of the coupling holes 200' of the bus bar 200 may be arranged on different planes. For example, the portions of the coupling holes 200' of the bus bar 200 may be arranged on inclined planes inclined at a certain angle with respect to each other. The portions of the coupling holes 200' of the bus bar 200 may be inclined with respect to each other to match a terminal structure of the battery pack 50 to be connected. Also, since the portions of the coupling holes 200' of the bus bar 200 are inclined with respect to each other, the portions of the coupling holes 200' of the bus bar 200 may be closely adhered between fastening members (not illustrated) including a pair of nuts and washers.

The bus bar cover 100 may cover the first and second bus bars 210 and 220 adjacent to each other, and the hollow portion 150 may include four hollow portions 150 corresponding to four coupling holes 200' formed at the first and second bus bars 210 and 220. In this case, the hinge portion 106 may be formed between the base portion 107 and each of the four hollow portions 150. According to the adjustment of the hinge portion 106, the four hollow portions 150 may be freely adjusted adaptively to the shape of the bus bar 200 while being freely pivoted with respect to each other.

A pivoting wing portion W may be formed at each of both end portions of the bus bar cover 100 in the length direction of the bus bar 200. The pivoting wing portion W may be pivotably connected with respect to the cover body B. More particularly, a hinge portion 105 may be formed between the cover body B and the pivoting wing portion W. The hinge portion 105 may allow the coupling of the bus bar cover 100 to the bus bar 200 by connecting the cover body B and the pivoting wing portion W pivotably with respect to each other. The bus bar cover 100 may be formed in an integral structure. In this case, through the pivoting operation of the hinge portion 105, the integrally formed bus bar cover 100 may entirely surround the bus bar 200. The pivoting wing portions W may be formed at both end portions of the cover body B and may cover both end portions of the bus bar 200 while pivoting in opposite directions facing each other.

A hook coupling portion h2 may be formed at the pivoting wing portion W. The pivoting wing portion W and the cover body B may be hook-coupled to each other. In an embodiment of the present disclosure, the hook coupling portion h2 of the pivoting wing portion W may be formed as an assembly protrusion, and the hook coupling portion h1 of the cover body B may be formed as a hole. More particularly, the hook coupling portion h2 of the pivoting wing portion W may be fastened to the hook coupling portion h1 formed at the external surface of the external insulating wall 102. For example, the hook coupling portion h2 of the pivoting wing portion W may be inserted into the hook coupling portion h1 of the cover body B.

The pivoting wing portion W may be coupled to the cover body B to be fixed to suppress the exposure of the bus bar 200 according to arbitrary pivoting thereof. A hole may be formed as the hook coupling portion h1 at the cover body B (the external insulating wall 102) hook-coupled to the pivoting wing portion W. The hook coupling portions h1 and h2 of the pivoting wing portion W and the cover body B may be formed in a complementary manner to each other. For example, an assembly protrusion may be formed at any one of the pivoting wing portion W and the cover body B, and a hole into which the assembly protrusion is to be inserted may be formed at the other one thereof.

The pivoting wing portion W may be formed to entirely cover each end portion of the bus bar 200. For example, the pivoting wing portion W may include a wall covering the longitudinal section E of the bus bar 200 and a wall covering the side surface of the bus bar 200. The surface of the pivoting wing portion W facing the cover body B may be open. For example, through the surface facing the cover body B, the pivoting wing portion W may be assembled toward the cover body B to accommodate the bus bar 200. Also, the bottom surface of the pivoting wing portion W may be open.

The pivoting wing portion W may be coupled with the cover body B and may insulate the bus bar 200 together with the cover body B. More particularly, the pivoting wing portion W may cover and insulate the side surface of the bus bar 200 together with the cover body B. More particularly, the pivoting wing portion W may insulate the outside of the bus bar 200 together with the external insulating wall 102 and accordingly, the pivoting wing portion W may be formed sufficiently wide to an equal width (in the width direction) with the external insulating wall 102. For example, the pivoting wing portion W may be formed wider than the bus bar 200 and may be formed wide to an equal width (in the width direction) with the internal insulating wall 101, together with the external insulating wall 102.

Although the present disclosure has been described with reference to the embodiments illustrated in the accompanying drawings, this is merely an example and those of ordinary skill in the art will understand that various modifications and other equivalent embodiments may be derived therefrom. Thus, the spirit and scope of the present disclosure should be defined by the appended claims.

INDUSTRIAL APPLICABILITY

The present disclosure may be applied to various devices using a battery as a rechargeable energy source and using a battery as a driving power supply.

The invention claimed is:

1. A battery module comprising:
   first and second bus bars arranged adjacent to each other to electrically connect battery packs adjacent to each other; and
   a bus bar cover covering and insulating the first and second bus bars from the outside thereof and insulating the first and second bus bars from each other,
   wherein the bus bar cover comprises a base portion and a hollow portion exposing a coupling hole of the first and second bus bars,
   wherein the hollow portion has a cylindrical shape extending in a direction away from an upper surface of the base portion, and
   wherein the cylindrical shape of the hollow portion is inclined relative to the upper surface of the base portion.

2. The battery module of claim 1, wherein the bus bar cover further comprises an internal insulating wall formed between the first and second bus bars.

3. The battery module of claim 2, wherein the bus bar cover further comprises an external insulating wall covering the outside of the first and second bus bars at a position facing the internal insulating wall.

4. The battery module of claim 3, wherein the internal insulating wall and the external insulating wall are formed wider than the first and second bus bars.

5. The battery module of claim 3, wherein the external insulating wall comprises a pair of external insulating walls arranged to face each other with the internal insulating wall therebetween.

6. The battery module of claim 1, wherein the hollow portion comprises four hollow portions exposing two pairs of coupling holes formed at both end portions of the first and second bus bars, respectively.

7. A battery module comprising:
   first and second bus bars arranged adjacent to each other to electrically connect battery packs adjacent to each other; and
   a bus bar cover covering and insulating the first and second bus bars from the outside thereof and insulating the first and second bus bars from each other,
   wherein the bus bar cover comprises a hollow portion exposing a coupling hole of the first and second bus bars, and
   wherein the bus bar cover further comprises:
   a base portion extending in a length direction of the first and second bus bars and covering a portion between coupling holes of the first and second bus bars; and
   a pivoting wing portion pivotably connected to the base portion to cover each end portion of the first and second bus bars.

8. The battery module of claim 7, wherein the pivoting wing portion comprises a pair of pivoting wing portions pivoting in opposite directions and covering both end portions in the length direction of the first and second bus bars.

9. The battery module of claim 7, wherein a hinge portion supporting a pivoting operation of the pivoting wing portion is formed between the base portion and the pivoting wing portion.

10. The battery module of claim 7, wherein the bus bar cover further comprises:
    an internal insulating wall extending from the base portion between the first and second bus bars; and
    an external insulating wall extending from the base portion to a position facing the internal insulating wall and covering the outside of the first and second bus bars.

11. The battery module of claim 10, wherein the pivoting wing portion and the external insulating wall are coupled to each other to cover the outside of the first and second bus bars together.

12. The battery module of claim 11, wherein the internal insulating wall is formed long to cover an entire length of the first and second bus bars, and
    the external insulating wall is formed shorter than the internal insulating wall.

13. The battery module of claim 11, wherein the pivoting wing portion and the external insulating wall are hook-coupled to each other.

14. The battery module of claim 7, wherein the bus bar cover further comprises an extension insulating wall extending from the base portion to cover a longitudinal section of the first and second bus bars, and
    the longitudinal section of the first and second bus bars is overlappingly covered by the extension insulating wall and the pivoting wing portion.

15. A battery module comprising:
    first and second bus bars arranged adjacent to each other to electrically connect battery packs adjacent to each other; and
    a bus bar cover covering and insulating the first and second bus bars from the outside thereof and insulating the first and second bus bars from each other,
    wherein the bus bar cover comprises a hollow portion exposing a coupling hole of the first and second bus bars, and
    wherein the bus bar cover further comprises a base portion extending in a length direction of the first and second bus bars and covering a portion between coupling holes of the first and second bus bars, and
    a hinge portion supporting a pivoting operation of the hollow portion is formed between the hollow portion and the base portion.

16. The battery module of claim 15, wherein a pair of hollow portions formed respectively on both sides of the base portion are not arranged on the same plane.

* * * * *